(12) United States Patent
Kanamori et al.

(10) Patent No.: US 6,262,184 B1
(45) Date of Patent: Jul. 17, 2001

(54) RESIN COMPOSITION AND MOLDED ARTICLE

(75) Inventors: Takeshi Kanamori, Ootsu; Hiroshi Urayama, Kyoto; Kyohei Takakuwa, Tsuchiura; Makoto Nakamura, Tsukuba; Yasuo Teraya, Kobe; Sakae Shimotsuma, Atsugi, all of (JP)

(73) Assignees: Shimadzu Corporation, Kyoto; Mitsubishi Gas Chemical Company, Inc., Tokyo; Starlite Co., Ltd., Osaka, all of (JP)

( * ) Notice: Subject to any disclaimer, the term of this patent is extended or adjusted under 35 U.S.C. 154(b) by 0 days.

(21) Appl. No.: 09/409,443

(22) Filed: Sep. 30, 1999

(30) Foreign Application Priority Data

Oct. 1, 1998 (JP) .................................................. 10-279481
Oct. 1, 1998 (JP) .................................................. 10-279482

(51) Int. Cl.$^7$ ............................. C08L 67/02; C08L 67/04
(52) U.S. Cl. ........................... 525/411; 525/413; 525/439
(58) Field of Search ..................................... 525/411, 413

(56) References Cited

U.S. PATENT DOCUMENTS 5,376,102 * 12/1994 Jarrett .................................... 525/415
5,646,217 * 7/1997 Hammond ............................. 525/450
5,691,424 * 11/1997 Suzuki .................................. 525/411
5,916,950 * 6/1999 Obuchi ................................. 524/492

* cited by examiner

Primary Examiner—Patricia A. Short
(74) Attorney, Agent, or Firm—Arent Fox Kintner Plotkin & Kahn, PLLC

(57) ABSTRACT

The present invention provides a resin composition comprising polylactic acid and aliphatic polyester carbonate, which has practically adequate heat-resistance temperature, moldability, thermostability, solvent resistance and high mechanical strength, as well as a molded article thereof. In the resin composition, the Vicat softening point is 60° C. or more, the tensile modulus of elasticity is 0.9 GPa or more, the modulus in flexure is 0.6 GPa or more, and the mixing ratio of polylactic acid (A) and aliphatic polyester carbonate (B), in terms of the ratio of (A)/(B) by weight, is 95/5 to 5/95. Further, the present invention provides a biodegradable injection-molded article having improvements in mechanical characteristics and impact resistance and superior disposal properties, particularly having strength enough to make it usable as a headgear material for use in helmets. The biodegradable injection-molded article is excellent in impact resistance, comprising mainly polylactic acid (A) and aliphatic polyester (E) and/or aliphatic polyester carbonate (B). This injection-molded article has a flexural strength of 30 MPa or more and an Izod impact strength of 3 kJ/m$^2$ or more, and it is used as helmet headgear.

27 Claims, No Drawings

RESIN COMPOSITION AND MOLDED ARTICLE

BACKGROUND OF THE INVENTION

1. Field of the Invention

The present invention relates to a resin composition comprising mainly polylactic acid and aliphatic polyester carbonate, as well as a molded article thereof.

The resin composition comprising mainly polylactic acid and aliphatic polyester carbonate according to the present invention is superior in flowablity and moldability and suitable for obtaining injection-molded articles, extrusion-molded articles, vacuum-formed articles, blow-molded article, fibers, multifilaments, monofilaments, ropes, nets, woven fabrics, knittings, nonwoven fabrics, films, sheets, laminates, vessels, foams, various parts and other molded articles. The resulting molded articles have adequate mechanical strength and thermostability and simultaneously they can be microbially decomposed easily in soil, active sludge and composts.

Accordingly, the present invention can be applied to a wide variety of uses where recycling is difficult in the fields of packaging materials, agriculture, fishery, foods etc.

For example, in the field of packaging materials, the molded article of the invention can be used as a film for packaging and can also be heat-sealed. Further, it can be utilized as a multi-film for covering the surface of soil to keep the temperature of the soil, as a pot and rope for garden plants, or as a coating material for fertilizers in the field of agriculture, or can be utilized as a fishing line, a casting net in the filed of fishery, or as a sanitary material such as medical materials and sanitary items in the medical field.

Further, the present invention relates to a biodegradable injection-molded article having improvements in mechanical characteristics and impact resistance as well as superior disposal properties.

2. Description of the Related Art

In recent years, there arises a need for development of high-molecular materials decomposable in the natural environment for environmental problems in the global scale, and particularly plastics decomposable by microorganisms are greatly expected for use as environmentally compatible materials or as a new type of functional materials. That is, molded articles consisting of biodegradable resin which can be decomposed under the natural environments are desired in recent years from the viewpoint of protection of the natural environments, and the study of naturally degradable resin such as aliphatic polyesters is actively conducted.

Heretofore, it is well-known that aliphatic polyesters are biodegradable, and typical examples of polymers obtained from aliphatic hydroxycarboxylic acids include poly-3-hydroxybutyrate (PHB) produced by microorganisms, poly-caprolactone (PCL) as a synthetic polymer and polylactic acid (PLLA) produced through fermentation from L-lactic acid as the starting material.

PHB-based biopolyesters are excellent in compatibility with the environment but poor in productivity, and because of high costs, there is a limit to their use as a substitute for general-purpose plastics. PCL is obtained with high degrees of polymerization to permit it to formed into a film, but it is poor in thermostability with a melting point of 65° C. or less, so its applicability is limited.

Particularly, polylactic acid is deemed most promising in respect of costs and physical properties, and it is a thermoplastic resin having transparency but suffers from problems in physical properties, such as poor elongation and flexibility as well as its low softening temperature. Further, because of the low rate of biodegradation thereof in the environment and the unstability thereof to hydrolysis, its improvements have been desired. That is, polylactic acid has a relatively high melting point of 150 to 180° C. and is superior in transparency, and thus it is expected for use as a molding material. However, polylactic acid though having high strength because of its rigid molecular structure has the problem of poor impact resistance and brittleness.

Aliphatic polyesters other than polylactic acid are generally superior in flexibility and impact resistance, but their melting point is 60 to 110° C. which is lower than that of polylactic acid, their glass transition temperature is room temperature or less and their crystallinity is high, so they are opaque and poor in strength.

On the one hand, aliphatic polyester carbonates obtained from aliphatic dibasic acids, aliphatic dihydroxy compounds and carbonate compounds are polymers excellent in moldability and biodegradability having physical properties similar to those of polyethylene. However, in fields where relatively high rigidity or tensile strength is required, their strength is not satisfactory. Their rigidity can be improved by use of fillers such as talc for improvement of rigidity, but there occurs the problem of reduction of flowablity etc., so it has been desired to improve rigidity without reducing flowablity.

As described above, while the existing biodegradable plastics have their respective characters, there are a number of unsatisfactory aspects, and therefore it has been desired to develop plastics with strength, thermostability, moldability and biodegradability balanced with one another.

SUMMARY OF THE INVENTION

The object of the present invention is to provide a resin composition comprising polylactic acid and aliphatic polyester carbonate, which has practically adequate heat-resistance temperature, moldability, thermostability, solvent resistance and high mechanical strength, as well as a molded article thereof.

As a result of their eager study to solve the problem described above, the present inventors found that a resin composition having heat distortion temperature satisfactory for practical use and having moldability, thermostability, solvent resistance and mechanical strength can be obtained by mixing polylactic acid excellent in rigidity and tensile strength with aliphatic polyester carbonate excellent in flexibility, hydrolysis resistance and biodegradability, and also that this resin composition has satisfactory biodegradability.

That is, the present invention relates to a composition comprising mainly polylactic acid, PLA (A) and aliphatic polyester carbonate, PEC (B) and to a molded article thereof.

More specifically, the present invention relates to a resin composition wherein the Vicat softening point is 60° C. or more, the tensile modulus of elasticity is 0.9 GPa or more, the modulus in flexure is 0.6 GPa or more, and the mixing ratio of polylactic acid (A) and aliphatic polyester carbonate (B), in terms of the ratio of (A)/(B) by weight, is 95/5 to 5/95, as well as a molded article thereof.

The resin composition comprising mainly polylactic acid and aliphatic polyester carbonate according to the present invention is superior in flowablity and moldability and suitable for obtaining injection-molded articles, extrusion-molded articles, vacuum-formed articles, blow-molded article, fibers, multifilaments, monofilaments, ropes, nets, woven fabrics, knittings, nonwoven fabrics, films, sheets, laminates, vessels, foams, various parts and other molded articles. The resulting molded articles have adequate mechanical strength and thermostability and are microbially decomposed easily in soil, active sludge and composts.

Accordingly, the present invention can be applied to a wide variety of uses where recycling is difficult in the fields of packaging materials, agriculture, fishery, foods etc.

For example, in the field of packaging materials, the molded article of the invention can be used as a film for packaging and can also be heat-sealed. Further, it can be utilized as a multi-film for covering the surface of soil to keep the temperature of the soil, as a pot and rope for garden plants, or as a coating material for fertilizers in the field of agriculture, or can be utilized as a fishing line, a casting net in the filed of fishery, or as a sanitary material such as medical materials and sanitary items in the medical field.

Another object of the present invention is to provide a biodegradable injection-molded article having improvements in mechanical characteristics and impact resistance and superior disposal properties, which particularly has strength enough to permit it to be useable as a headgear material for use in helmets.

As a result of their eager study, the present inventors found that polylactic acid and aliphatic polyester and/or aliphatic polyester carbonate can be used to obtain a biodegradable injection-molded article, which while maintaining biodegradability, has strength and impact resistance, particularly with strength enough to permit it to be usable as a headgear material for use in helmets.

That is, the present invention relates to a biodegradable injection-molded article excellent in impact resistance, comprising mainly polylactic acid (A) and aliphatic polyester (E) and/or aliphatic polyester carbonate (B). Further, the present invention relates to the injection-molded article wherein the flexural strength is 30 MPa or more. Further, the present invention relates to the injection-molded article wherein the Izod impact strength is 3 kJ/m$^2$ or more and further to the injection-molded article for use as a helmet headgear.

According to the present inventors, polylactic acid and aliphatic polyester and/or aliphatic polyester carbonate can be used as described above to provide a biodegradable injection-molded article, which while maintaining biodegradability, has strength and impact resistance, particularly with strength enough to permit it to be usable as a headgear material for use in helmets.

DETAILED DESCRIPTION OF THE INVENTION

In the present invention, polylactic acid (A) is a polymer consisting substantially of monomer units derived from only L-lactic acid and/or D-lactic acid. Here, the term "substantially" means that other monomers not derived from L- or D-lactic acid may be contained in the polymer in the range where the effects of the present invention are not deteriorated.

The method of producing polylactic acid (A) may be any known arbitrary polymerization methods. The most typically known method is a method (lactide process) of ring-opening polymerization of lactide i.e. an anhydrous cyclic lactic acid dimer, but lactic acid may be directly polycondensated. The molecular weight is preferably in the range of 50,000 to 1,000,000 in terms of weight average molecular weight. If the molecular weight is below this range, its mechanical physical properties cannot be sufficiently exhibited, whereas a molecular weight exceeding said range brings about inferior processability.

If polylactic acid (A) is composed exclusively of monomer units derived from L- and/or D-lactic acid, the resulting polymer is crystalline with a high melting point. Further, by varying the ratio of monomer units derived from L- and D-lactic acid (abbreviated hereinafter to the L/D ratio), the crystallinity and melting point of the resulting polymer can be arbitrarily controlled, thus enabling control of practical characteristics depending the desired use.

In the present invention, in consideration of the balance between high thermostability and molding characteristics, the L/D ratio is preferably 90/10 to 99/1.

The aliphatic polyester carbonate (B) in the present invention is characterized in that it has a carbonate unit content of at least 5 mol % or more, a weight average molecular weight of at least 100,000, a melt viscosity of 2,000 to 50,000 poises at a temperature of 190° C. under a loading of 60 kg, and a melting point of 70 to 180° C., said aliphatic polyester carbonate (B) being obtained by allowing an aliphatic polyester oligomer having a number average molecular weight of 10,000 or less obtained by reaction of an aliphatic dibasic acid and/or a derivative thereof with an aliphatic dihydroxy compound and/or a hydroxycarboxylic acid compound to react with a carbonate compound.

The process for producing an aliphatic polyester carbonate according to the present invention is composed of a first step of obtaining an aliphatic polyester oligomer from an aliphatic dibasic acid and/or a derivative thereof and an aliphatic dihydroxy compound and/or a hydroxycarboxylic acid compound, and a second step of obtaining an aliphatic polyester carbonate by reacting the aliphatic polyester oligomer with a carbonate compound.

The first step is a step of producing a polyester oligomer with a number average molecular weight of 10,000 or less in the presence of a catalyst at a temperature of 100 to 250° C. while an excess dihydroxy compound and water formed as a byproduct during the reaction are removed. For the purpose of promoting the reaction, a reduced pressure of 300 mmHg or less is preferable.

The second step is a step of making a polymer by reaction of the polyester oligomer obtained in the first step with a carbonate compound, wherein the reaction is conducted usually at 150 to 250° C., preferably at 200 to 220° C. in the presence of a catalyst, and the hydroxyl compound produced as a byproduct during the reaction is removed. At a reaction temperature of 150° C., or less, an adequate reaction rate cannot be achieved, whereas at a temperature of 250° C. or more, the polymerization reaction can proceed rapidly but the resulting polymer may be colored, resulting in undesirable results. Depending on the boiling temperature of the aliphatic carbonate compound used in the reaction, there arises the necessity for conducting the reaction under pressure at the initial stage of the reaction. At the later stage of the reaction, the degree of reduced pressure is preferably regulated gradually to a reduced pressure of finally 3 mmHg or less.

The carbonate unit content in the aliphatic polyester carbonate can be controlled as desired by regulating the amount of terminal hydroxyl group of the aliphatic polyester oligomer. If the carbonate unit content is too high, the melting point of the resulting aliphatic polyester carbonate is low, and the polymer having practical thermostability cannot be obtained. On the one hand, if the carbonate unit content is increased, degradability by microorganisms becomes high. Accordingly, the carbonate unit content is preferably an amount capable of realizing suitable biodegradability and practical thermostability, and in the present invention the carbonate unit content in the aliphatic polyester carbonate is at least 5 mol % or more, usually preferably 5 to 30 mol %, and particularly preferably 7 to 25 mol %.

The aliphatic dibasic acid used for production of the aliphatic polyester carbonate of the present invention includes succinic acid as the essential component, and besides, e.g. oxalic acid, malonic acid, glutaric acid, adipic acid, suberic acid, sebacic acid, dodecanoic acid and azelaic acid etc. can be used in combination as necessary. The above-described aliphatic dibasic acids may be esters or acid anhydrides thereof.

The aliphatic dihydroxy compound used for production of the aliphatic polyester carbonate of the present invention includes 1,4-butanediol as the essential component, and besides, e.g. ethylene glycol, trimethylene glycol, propylene glycol, 1,3-butanediol, pentanediol, hexanediol, octanediol, neopentyl glycol, cyclohexanediol, cyclohexanedimethanol etc. can be used in combination as necessary.

The hydroxycarboxylic acid compound used in the present invention includes lactic acid, glycolic acid, β-hydroxybutyric acid, hydroxypivalic acid, hydroxyvaleric acid etc. and these can also be used in the form of derivatives such as esters and cyclic esters.

These aliphatic dibasic acids, aliphatic dihydroxy compounds and hydroxycarboxylic acid compounds can be used alone or as a mixture thereof, and a desired combination thereof can be used. In the present invention, those having suitable biodegradability and a high melting point capable of realizing practical thermostability are preferable.

Accordingly, in the present invention, 1,4-butanediol as the aliphatic dihydroxy compound and succinic acid as the aliphatic dibasic acid should be contained in an amount of 50 mol % or more, respectively.

Specific examples of carbonate compounds used in production of the aliphatic polyester carbonate of the present invention include, but are not limited to, diaryl carbonates such as diphenyl carbonate, ditolyl carbonate, bis (chlorophenyl) carbonate and m-cresyl carbonate, and aliphatic carbonates such as dimethyl carbonate, diethyl carbonate, diisopropyl carbonate, dibutyl carbonate, diamyl carbonate and dioctyl carbonate. In addition to the carbonate compounds made from the same kinds of hydroxyl compounds as the starting material as described above, it is also possible to use unsymmetrical carbonate compounds made from different kinds of hydroxyl compounds as the starting material, or cyclic carbonate compounds.

The resin composition of the present invention comprises mainly the polylactic acid and aliphatic polyester carbonate resin described above, and it can be modified by adding an ester-exchange catalyst, various monomers, coupling agents, terminal treatment agents, other resins, wood powder, starch etc. in addition to various additives such as modifiers, bulking agents, lubricants, UV absorbers, antioxidants, stabilizers, pigments, coloring matters, various fillers, antistatic agents, releasing agents, plasticizers, perfumes, antifungus agents etc.

The resin composition can be obtained by mechanically mixing both the resins above the temperature at which at least one of the resins is molten. Alternatively, the resin composition can be produced by mechanically grinding both the resins, then mixing and compression thereof, or by dissolving both the resins in solvent and then mixing the resulting solution with poor solvent for precipitation thereof, or by dissolving both the resins in solvent and then casting the solution to remove the solvent, but the production method is not limited to those described above. The mixing apparatus is not particularly limited either, but a mixing method of using an extruder is industrially recommended because the resins can be mixed in a short time and treated continuously.

The specific temperature for mixing is preferably in the range of 100 to 300° C. because at 100° C. or less, the resins have high melt viscosity or are not molten. A temperature of 300° C. or more is not preferable because thermal decomposition of the resins occurs. It is preferable to mix the resins in a short time in a nitrogen atmosphere even at 300° C. or less in order to prevent coloration, deterioration and thermal decomposition at high temperatures. Specifically, the mixing time is recommended to be within 20 minutes.

Further, a vent opening may be formed for mixing under reduced pressure in order to remove oligomers and remaining monomers in resin, generated gas etc.

The resin composition of the present invention is not limited to a simple blend of polylactic acid and aliphatic polyester carbonate, and includes copolymers formed by the ester exchange reaction in a molten state in the presence of a catalyst.

The mixing ratio of polylactic acid (A) and aliphatic polyester carbonate (B), in terms of the ratio of (A)/(B) by weight, is preferably in the range of 95/5 to 5/95. If the amount of polylactic acid added is 5% or less, a tensile modulus of elasticity of 0.9 GPa or more and a modulus in flexure of 0.6 GPa or more cannot be achieved. Further, in the case of 5% or less aliphatic polyester carbonate, a Vicat softening temperature of 60° C. or more cannot be achieved.

The molecular weights of the resins used are preferably 100,000 or more in terms of weight average molecular weight, as determined by GPC using polystyrene standards. A molecular weight of 100,000 or less does not lead to the desired strength.

If the ratio of aliphatic polyester carbonate is high, biodegradability, hydrolysis resistance, and softening temperature are raised, and whereas if the ratio of polylactic acid is high, tensile strength and flexural strength are increased, so it is possible to design resin depending on the desired use and object.

However, if high transparency is necessary and certain degrees of biodegradability, hydrolysis resistance etc. are desired to be given, 5% or less aliphatic polyester carbonate can also be used, and further if certain degrees of flexural strength and tensile strength are necessary while high flexibility is maintained, 5% or less polylactic acid can also be used.

The molded article of the present invention is a molded article using the resin composition of the present invention, and specific molded forms and molding methods include, but are not limited to, injection-molded articles, extrusion-molded articles, vacuum-formed articles, blow-molded article, fibers, multifilaments, monofilaments, ropes, woven fabrics, nets, knittings, nonwoven fabrics, films, sheets, laminates, vessels, foams, various parts and other molded articles.

For the uniformity, strength, appearance etc. of the resin, polylactic acid and aliphatic polyester carbonate are preferably mixed to form pellets before molding. Alternatively, polylactic acid and aliphatic polyester carbonate, both in the form of pellets, and in some cases various additives can be simultaneously mixed and introduced directly into a molding unit to give a molded article.

Alternatively, both the resins are dissolved in solvent, then the resulting solution is cast or applied, and the solvent is removed whereby a molded article such as film, sheet etc. can also be obtained.

The resulting molded articles have high mechanical strength and practically adequate softening temperature, and these can be microbially decomposed easily in soil, active sludge and composts.

The biodegradability of the resin composition and the molded article according to the present invention can be regulated by the molecular weight, the D/L ratio of polylactic acid, the carbonate unit content in aliphatic polyester carbonate, the mixing ratio of polylactic acid and aliphatic polyester carbonate, and the thickness of the molded article, and a compost test on their powder indicates 90% or more degradability.

As described above, the resin composition and the molded article having practically adequate thermostability and strength can be obtained according to the present invention.

In the present invention, aliphatic polyester (E) (hereinafter referred to merely as "aliphatic polyester") other than polylactic acid is a polymer consisting of e.g. an aliphatic carboxylic acid component and aliphatic alcohol component.

The method of producing aliphatic polyester (E) includes a method of obtaining the polymer by direct polymerization and a method of indirectly obtaining the polymer by use of a chain-extending agent after polymerization of an e.g. oligomer-size molecule. The aliphatic polyester (E) used in the present invention is composed preferably of dicarboxylic acid and diol. The aliphatic dicarboxylic acid includes compounds such as succinic acid, adipic acid, suberic acid, sebacic acid and dodecanoic acid or anhydrides and derivatives thereof. The aliphatic diol includes glycol-type compounds such as ethylene glycol, butanediol, hexanediol, octanediol and cyclohexanedimethanol, as well as derivatives thereof. Any of them are compounds having a C2 to C10 alkylene group, cyclo-ring or cycloalkylene group and these are produced by polycondensation. The carboxylic acid components and alcohol components may be used alone or in combination thereof.

For the purpose of providing the polymer with a branched chain for improving melt viscosity, tri- or more functional carboxylic acid, alcohol or hydroxycarboxylic acid may be used.

If these components are used in a large amount, the resulting polymer has a crosslinked structure to render it non-thermoplastic, and even if it is thermoplastic, there may partially occur micro-gel having a highly crosslinked structure. Accordingly, these tri- or more functional components are contained in such a trace amount that they do not greatly influence the chemical property and the physical property of the polymer.

As the poly-functional components, it is possible to use maleic acid, tartaric acid, citric acid, trimellitic acid, pyromellitic acid or pentaerythritol or trimethylol propane. Among the production methods described above, the direct polymerization method is a method of obtaining the polymer wherein the above-described compounds are selected and water contained in the compounds or water generated in the polymerization is removed. In the indirect polymerization method, the above-described compounds are selected and polymerized until an e.g. oligomer-size molecule is produced, and then with the aim of increasing its molecular weight, a small amount of a chain-extending agent such as diisocyanate compound, for example hexamethylene diisocyanate, isophorone diisocyanate, xylylene diisocyanate or diphenyl methane diisocyanate, is used to polymerize the oligomer-size molecule.

Now, the process for producing the injection-molded article according to the present invention is described. First, the mixing method and the mixing apparatus for polylactic acid (A) and aliphatic polyester (E) and/or aliphatic polyester carbonate (B) are not particularly limited, but those permitting continuous treatment is industrially advantageous and thus preferable. For example, 2 kinds or more of pellets may be mixed at a predetermined ratio and introduced as such into a hopper in an injection molding machine, molten and immediately molded. Alternatively, after both the components may be molten and mixed, the mixture is once formed into pellets, and thereafter, the pellets may be molten and molded as necessary. Alternatively, the respective polymers may be separately molten in an extruder etc., then mixed by a stationary mixer and/or a mechanical stirrer, and immediately molded or once formed into pellets. A stationary mixer may be used in combination with mechanical stirring in an extruder etc. For uniform mixing, the method of forming pellets once is preferable, while in the case of the melting and mixing method it is necessary to substantially prevent polymer deterioration, modification, and copolymerization reaction due to ester exchange reaction, so it is preferable to mix the resins in a short time at a temperature as low as possible. The temperature for melt extrusion is selected as necessary in consideration of the melting point and mixing ratio of biodegradable resins used, and this temperature is usually in the range of 100 to 250° C.

The polymers mixed in the above-described methods are introduced into a hopper of a conventional injection molding machine, then molten and injection-molded whereby the injection-molded article of the present invention can be easily obtained.

The injection-molded article of the present invention refers to every molded article such as vessels and writing materials which can be molded in a conventional injection molding machine. Regarding industrial use, for example, the injection-molded article of the present invention is useful as a carriage or storage tray for production of semiconductors or liquid crystals employing low electrification-property of the resin composition of the present invention, a disposable industrial apparatus unit or its parts (for example, an exchange unit or its parts), or a molded article for protecting all sorts of parts at the time of transport or storage. Further, the injection-molded article of the present invention is particularly suitable as a molded article for use as a helmet headgear requiring strength. For these uses, the injection-molded article of the present invention preferably has a flexural strength of 30 MPa or more, and/or an Izod impact strength of 3 $kJ/m^2$ or more.

The biodegradable injection-molded article of the present invention comprises polylactic acid (A) and aliphatic polyester (E) other than polylactic acid and/or aliphatic polyester carbonate (B), and it is decomposed in the natural environment. In general, the rate of decomposition of aliphatic polyester (E) and aliphatic polyester carbonate is higher than that of polylactic acid, and thus the rate of decomposition of the injection-molded article can be controlled as necessary by selecting the mixing ratio of the resins.

Further, when the resins are melt-mixed or injection molded, secondary additives can be added to attain various modifications. Examples of such secondary additives include stabilizers, antioxidants, UV absorbers, pigments, coloring matters, various fillers, antistatic agents, releasing agents, plasticizers, perfumes, anti-fungus agents, nucleating agents or other similar materials.

EXAMPLES

Hereinafter, the present invention is described in more detail by reference to the Examples and Comparative Examples.

In the Examples, the melting point was measured using DSC (SSC 5000, Seiko Denshi Co., Ltd.). The molecular weights (Mw & Mn) of the polymers were determined in chloroform as the solvent by GPC (GPC System-11, Showa Denko, K. K.) using polystyrene standards. The carbonate unit content was determined in terms of the ratio (mol %) of the carbonate unit to the total amount of the dicarboxylate unit and carbonate unit by $^{13}$C-NMR with the use of NMR (NMR EX-270, JEOL Ltd.).

The melt viscosity of the aliphatic polyester carbonate was determined at a temperature of 190° C. under a loading of 60 kg in a flow tester (CFT-500C, Shimadzu Corporation).

The hydroxyl group value and acid value of oligomer of the aliphatic polyester carbonate were measured according to JIS K-1557.

Example 1

Production of Polylactic Acid

A reactor was charged with L-lactide (Shimadzu Corporation), and a ring opening polymerization catalyst, tin octylate, was added thereto in an amount of 0.001 wt-% relative to L-lactide, and the L-lactide was subjected to continuous polymerization reaction at a reaction temperature of 180° C. for an average retention time of 18 hours in the reactor. The resulting polymer was introduced via the outlet of the reactor into a twin-screw extruder and kneaded at a temperature of 180° C. at a pressure of 5 mmHg for an average retention time of 10 minutes during which unreacted lactide was removed, and polylactic polymer (A-1) with a weight average molecular weight of 200,000 was obtained from the outlet of the extruder.

Example 2

A 50-L reaction vessel equipped with a stirrer, a fractional-distillation condenser, a thermometer, and a gas inlet was charged with 18,740 g (158.7 moles) of succinic acid, 21,430 g (237.8 moles) of 1,4-butanediol, 745 mg of zirconium acetylacetonato and 1.40 g of zinc acetate, and the mixture was allowed to react at a temperature of 150 to 220° C. for 2 hours in a nitrogen atmosphere and water was distilled away. Then, the reaction solution was aged for 3 hours under reduced pressure at a reduced pressure of 150 to 80 mmHg to permit dehydration reaction to proceed, and the degree of reduced pressure was gradually increased finally to a degree of reduced pressure of 2 mmHg or less, and water and 1,4-butanediol were further distilled away, and when the materials distilled away reached 10,460 g in total, the reaction was terminated. The resulting oligomer (B-1) indicated a number average molecular weight of 1,780, a terminal hydroxyl group value of 102 KOHmg/g, and an acid value of 0.51 KOHmg/g.

Then, the resulting oligomer (B-1), 24,000 g, was introduced into a 50-L reaction vessel equipped with a stirrer, a fractional-distillation condenser, a thermometer and a gas inlet, and 4,680 g of diphenyl carbonate was added thereto. The mixture was allowed to react for 5 hours at a temperature of 210 to 220° C. at a reduced pressure of finally 1 mmHg. The melting point of the resulting polymer (B-2) was 104° C., and its weight average molecular weight (Mw) as determined by GPC was 188,000, and $^{13}$C-NMR measurement indicated that it had 14.3% carbonate unit as the polycarbonate component. The melt viscosity was 10,000 poises, and it was completely dissolved without forming any gel in chloroform.

Example 3

Polylactic acid (A-1) obtained in Example 1 and aliphatic polyester carbonate (B-2) obtained in Example 2, both in the form of pellets, were dried separately at a temperature of 90° C. for 10 hours in a vacuum dryer and mixed in a V-shaped blender where the mixing ratio of A-1/B-2 was 10/90 by weight, and the mixture was fed to a twin-screw extruder (screw diameter of 25 mm$\phi$, L/D=30) to be continuously converted into strands and then pellets to give resin mixture (C-1).

Pellets of C-1 were dried at a temperature of 90° C. for 5 hours or more, then fed to an injection molding machine (mold clamping pressure: 100 tons) and molded into specimens to be examined for physical properties. The evaluation results of the resulting specimens indicated that the Vicat softening point is 83° C., the tensile modulus of elasticity is 1 GPa, and the modulus in flexure is 0.8 GPa. The results are shown in Table 1.

Examples 4 to 7

The same operation as in Example 3 was conducted except that the mixing ratio of polylactic acid (A-1) and aliphatic polyester carbonate (B-2) was changed to 30/70, 50/50, 70/30 and 90/10 in ratio by weight in Examples 4 to 7, respectively. The results of the evaluated physical properties of the resulting specimens are shown in Table 1.

Comparative Examples 1 and 2

The same operation as in Example 3 was conducted except that 100% aliphatic polyester carbonate (B-2) was used in Comparative Example 1 and 100% polylactic acid (A-1) was used in Comparative Example 2. The results are shown in Table 1.

The specimens of resin mixtures, aliphatic polyester carbonate and polylactic acid, produced respectively in Examples 3 to 7 and Comparative Examples 1 and 2, were used to form sheets of 150 $\mu$m in thickness, and these specimens were examined in a soil-laying test under the conditions of 25° C. and 60% RH. Each specimen was cut into 20×90 mm piece and laid in soil in 5 cm depth from the surface. Changes such as disappearance of these resin specimens by decomposition or formation of holes by decomposition during 18 weeks were observed. The changes in weight of the specimens are shown in Table 1.

TABLE 1

| | PLA/PEC (Ratio by weight) | Tensile strength (GPa) | Flexural strength (GPa) | Vicat softening point (° C.) | Degree of biodegradation (weight reduction (%)) |
|---|---|---|---|---|---|
| Example 3 | 10/90 | 1.0 | 0.8 | 85 | 100 |
| Example 4 | 30/70 | 1.6 | 1.4 | 80 | 90 |
| Example 5 | 50/50 | 2.3 | 1.8 | 68 | 74 |
| Example 6 | 70/30 | 2.8 | 2.5 | 65 | 56 |
| Example 7 | 90/10 | 3.4 | 3.0 | 63 | 35 |
| Comparative Example 1 | 0/100 | 0.6 | 0.5 | 88 | 100 |
| Comparative Example 2 | 100/0 | 3.8 | 3.4 | 58 | 2 |

(The degree of biodegradation indicates the degree of weight reduction of a 150 $\mu$m film specimen after 18 weeks.)

From these results, it is understood that as the aliphatic polyester carbonate content is increased, the biodegradability of the resulting composition is improved and the rate of biodegradation thereof can be easily controlled.

In the Examples which follow, the weight average molecular weight (Mw) of the polymer was determined by GPC analysis using polystyrene standards. The bend test and tensile test were conducted in accordance with JIS-K7203 and JIS-K7113 respectively, and the Izod impact strength was examined in accordance with JIS-K7110.

In the Examples, the following 3 kinds of biodegradable resin were used in the experiment.

<Polylactic Acid (A)>

Lacty #5000, produced by Shimadzu Corporation Weight average molecular weight: 200,000.

<Aliphatic Polyester (E)>

Bionole #3010, produced by Showa High Polymer Co., Ltd.

Weight average molecular weight: 140,000.

<Aliphatic Polyester Carbonate (B)>

Polyester Carbonate (PEC), produced by Mitsubishi Gas Chemical Co., Inc.

Weight average molecular weight: 136,000.

Example 8

Polylactic acid (A) and aliphatic polyester carbonate (B) both in the form of pellets, previously completely dried by preliminary drying, were mixed at the ratio of 40:60 by weight and introduced into an injection molding machine to prepare a bend specimen, a tensile specimen (Specimen No. JIS-2), an Izod impact specimen and a flat plate (150 mm×50 mm×3 mm thickness), and their physical properties were examined. The flat plate thus obtained was examined in a 9.1 anti-penetration test (9.1.2 anti-penetration test method II) in accordance with JIS-T8131 (Safety Helmet for Industry).

Example 9

Polylactic acid (A) and aliphatic polyester carbonate (B) both in the form of pellets, previously completely dried by preliminary drying, were mixed at the ratio of 45:55 by weight, then molten and mixed in a twin-screw at 220° C. for 4 minutes in average, extruded through a nozzle of 2 mm in diameter, cooled with water and cut into pellets (P1). The pellets (P1) were completely dried at 85° C. in vacuo and introduced into an injection molding machine to prepare a bend specimen, a tensile specimen (Specimen No. JIS-2), an Izod impact specimen and a flat plate (150 mm×50 mm×3 mm thickness), and their physical properties were examined. The flat plate thus obtained was examined in a 9.1 anti-penetration test (9.1.2 anti-penetration test method II) in accordance with JIS-T8131 (Safety Helmet for Industry).

Example 10

Polylactic acid (A) and aliphatic polyester (E) both in the form of pellets, previously completely dried by preliminary drying, were mixed at the ratio of 50:50 by weight and introduced into an injection molding machine to prepare a bend specimen, a tensile specimen (Specimen No. JIS-2), an Izod impact specimen and a flat plate (150 mm×50 mm×3 mm thickness), and their physical properties were examined. The flat plate thus obtained was examined in a 9.1 anti-penetration test (9.1.2 anti-penetration test method II) in accordance with JIS-T8131 (Safety Helmet for Industry).

Comparative Example 3

Polylactic acid (A) previously completely dried by preliminary drying was introduced into an injection molding machine to prepare a bend specimen, a tensile specimen (Specimen No. JIS-2), an Izod impact specimen and a flat plate (150 mm ×50 mm×3 mm thickness), and their physical properties were examined. The flat plate thus obtained was examined in a 9.1 anti-penetration test (9.1.2 anti-penetration test method II) in accordance with JIS-T8131 (Safety Helmet for Industry).

Comparative Example 4

Aliphatic polyester (E) previously completely dried by preliminary drying was introduced into an injection molding machine to prepare a bend specimen, a tensile specimen (Specimen No. JIS-2), an Izod impact specimen and a flat plate (150 mm ×50 mm×3 mm thickness), and their physical properties were examined. The flat plate thus obtained was examined in a 9.1 anti-penetration test (9.1.2 anti-penetration test method II) in accordance with JIS-T8131 (Safety Helmet for Industry).

The results of Examples 8 to 10 and Comparative Examples 3 to 4 are shown in Table 2.

The polymer in Comparative Example 3 was high in strength but low in impact resistance, and its specimen was broken in the anti-penetration test.

The polymer in Comparative Example 4 was high in impact resistance but low in strength, and the striker penetrated through it in the anti-penetration test.

Any of the polymer compositions in Examples 8 to 10 were superior in balance among mechanical characteristics, and neither the lowest point of the dent nor the steel striker was brought into contact with the bole in the anti-penetration test, and these polymer compositions were thus confirmed to have physical properties meeting the helmet JIS standards.

TABLE 2

|  | Unit | Example 8 | Example 9 | Example 10 | Comparative Example 3 | Comparative Example 4 |
| --- | --- | --- | --- | --- | --- | --- |
| (A) | Part by weight | 40 | 45 | 50 | 100 | — |
| (E) | Part by weight | — | — | 50 | — | 100 |
| (B) | Part by weight | 60 | 55 | — | — | — |
| Flexural Strength | MPa | 61.0 | 66.0 | 64.0 | 80.0 | 22.0 |
| Modulus in flexure | GPa | 1.61 | 1.79 | 1.89 | 3.47 | 0.60 |
| Tensile strength | MPa | 34.8 | 37.3 | 39.4 | 69.4 | 46.0 |
| Tensile modulus of elasticity | GPa | 1.94 | 2.13 | 2.27 | 4.08 | 0.60 |
| Izod impact strength | $KJ/m^2$ | 7.4 | 7.0 | 4.5 | 2.7 | 9.6 |
| Anti-penetration test | — | Acceptable | Acceptable | Acceptable | Not Acceptable (broken) | Not Acceptable (penetrated) |

What is claimed is:

1. A resin composition comprising mainly polylactic acid (A) and aliphatic polyester carbonate (B), wherein the Vicat softening point is 60° C. or more, the tensile modulus of elasticity is 0.9 GPa or more, and the modulus in flexure is 0.6 GPa or more.

2. The resin composition according to claim 1, wherein the mixing ratio of polylactic acid (A) and aliphatic polyester carbonate (B), in terms of the ratio of (A)/(B) by weight, is 95/5 to 5/95.

3. The resin composition according to claim 1, wherein the weight average molecular weight of polylactic acid (A) is at least 100,000 or more.

4. The resin composition according to claim 1, wherein the carbonate unit content in aliphatic polyester carbonate (B) is at least 5 mol % or more.

5. The resin composition according to claim 1, wherein the carbonate unit content in aliphatic polyester carbonate (B) is 5 to 30 mol %.

6. The resin composition according to claim 1, wherein an aliphatic dibasic acid used for production of aliphatic polyester carbonate (B) includes succinic acid and/or a derivative thereof as the essential component, and as necessary, an aliphatic dibasic acid selected from oxalic acid, malonic acid, glutaric acid, adipic acid, suberic acid, sebacic acid, dodecanoic acid and azelaic acid and/or derivatives thereof as components used in combination.

7. The resin composition according to claim 1, wherein an aliphatic dihydroxy compound used for production of aliphatic polyester carbonate (B) includes 1,4-butanediol as the essential component, and as necessary, ethylene glycol, trimethylene glycol, propylene glycol, 1,3-butanediol, pentanediol, hexanediol, octanediol, neopentyl glycol, cyclohexanediol and cyclohexane-dimethanol as components used in combination.

8. The resin composition according to claim 1, wherein a hydroxy-carboxylic acid compound used in production of aliphatic polyester carbonate (B) includes a hydroxycarboxylic acid selected from lactic acid, glycol acid, β-hydroxybutyric acid, hydroxypivalic acid and hydroxylvaleric acid and/or derivatives thereof.

9. The resin composition according to claim 1, wherein the aliphatic polyester carbonate (B) contains at least 50 mol % 1,4-butanediol unit in an aliphatic dihydroxy compound unit and at least 50 mol % succinic acid in the aliphatic dibasic acid unit.

10. The resin composition according to claim 1, wherein the carbonate compound used in production of aliphatic polyester carbonate (B) includes diaryl carbonate compound (s) selected from diphenyl carbonate, ditolyl carbonate, bis(chlorophenyl) carbonate and m-cresyl carbonate and/or aliphatic carbonate compound(s) selected from dimethyl carbonate, diethyl carbonate, diisopropyl carbonate, dibutyl carbonate, diamyl carbonate and dioctyl carbonate.

11. A molded article obtained by molding the composition described in claim 1.

12. A resin composition comprising mainly polylactic acid (A) and aliphatic polyester carbonate (B), wherein the aliphatic polyester carbonate (B) has a carbonate unit content of at least 5 mol % or more, a weight average molecular weight of at least 100,000, a melt viscosity of 2,000 to 50,000 poises at a temperature of 190° C. under a loading of 60 kg, and a melting point of 70 to 180° C., said aliphatic polyester carbonate (B) being obtained by allowing an aliphatic polyester oligomer having a number average molecular weight of 10,000 or less obtained by reaction of an aliphatic dibasic acid and/or a derivative thereof with an aliphatic dihydroxy compound and/or a hydroxycarboxylic acid compound to react with a carbonate compound.

13. The resin composition according to claim 12, wherein the Vicat softening point is 60° C. or more, the tensile modulus of elasticity is 0.9 GPa or more, and the modulus in flexure is 0.6 GPa or more.

14. The resin compositon according to claim 12, wherein the mixing ratio or polylactic acid (A) and aliphatic polyester carbonate (B), in terms of the ratio of (A)/(B) by weight is 95/5 to 5/95.

15. The resin composition according to claim 12, wherein the weight average molecular weight of polyactic acid (A) is at least 100,000 or more.

16. The resin composition according to claim 12, wherein the carbonate unit content is aliphatic polyester carbonate (B) is at least 5 mol % or more.

17. The resin composition according to claim 12, wherein the carbonate unit content in aliphatic polyester carbonate (B) is 5 to 30 mol %.

18. The resin composition according to claim 12, wherein an aliphatic dibasic acid used for production of aliphatic polyester carbonate (B) includes succinic acid and/or a derivative thereof as the essential component, and as necessary, an aliphatic dibasic acid selected from oxalic acid, malonic acid, glutaric acid, adipic acid, suberic acid, sebacic acid, dodecanoic acid and azelaic acid and/or derivatives thereof as components used in combination.

19. The resin composition according to claim 12, wherein an aliphatic dihydroxy compound used for production of aliphatic polyester carbonate (B) includes 1,4-butanediol as the essential component, and as necessary, ethylene glycol, trimethylene glycol, propylene glycol, 1,3-butanediol, pentanediol, hexanediol, octanediol, neopentyl glycol, cyclohexanediol and cyclohexane-dimethanol as components used in combination.

20. The resin composition according to claim 12, wherein a hydroxy-carboxylic acid compound used in production of aliphatic polyester carbonate (B) includes a hydroxybutyric acid selected from lactic acid, glycol acid, β-hydroxycarboxylic acid, hydroxypivalic acid and hydroxylvaleric acid and/or derivatives thereof.

21. The resin composition according to claim 12, wherein the aliphatic polyester carbonate (B) contains at least 50 mol % 1,4-butanediol unit in an aliphatic dihydroxy compound unit and at least 50 mol % succinic acid in the aliphatic dibasic acid unit.

22. The resin composition according to claim 12, wherein the carbonate compound used in production of aliphatic polyester carbonate (B) includes diaryl carbonate compound (s) selected from diphenyl carbonate, ditolyl carbonate, bis (chlorophenyl) carbonate and m-cresyl carbonate and/or aliphatic carbonate compound(s) selected from dimethyl carbonate, diethyl carbonate, diisopropyl carbonate, dibutyl carbonate, diamyl carbonate and dioctyl carbonate.

23. A molded article obtained by molding the composition described in claim 12.

24. A biodegradable injection-molded article excellent in impact resistance, comprising mainly polylactic acid (A) and aliphatic polyester carbonate (B) ), wherein the Vicat softening point is 60° C. or more, the tensile modulus of elasticity is 0.9 GPa or more, and the modulus in flexure is 0.6 GPa or more.

25. The injection-molded article according to claim 24, wherein the flexural strength is 30 MPa or more.

26. The injection-molded article according to claim 24, wherein the Izod impact strength is 3 kJ/m$^2$ or more.

27. The injection-molded article according to claim 24, wherein the molded article is a helmet.

* * * * *